United States Patent
Min et al.

(10) Patent No.: US 8,430,069 B2
(45) Date of Patent: Apr. 30, 2013

(54) INTEGRATED HYBRID HEAT EXCHANGER WITH MULTI-SECTIONAL STRUCTURE

(75) Inventors: Eun Ki Min, Daejeon (KR); Byoung Sun Cho, Daejeon (KR); Yong Woong Cha, Yongin-si (KR); Jae Yeon Kim, Hwaseong-si (KR)

(73) Assignees: Hyundai Motor Company, Seoul (KR); Halla Climate Control Corp., Daejeon (KR)

( * ) Notice: Subject to any disclaimer, the term of this patent is extended or adjusted under 35 U.S.C. 154(b) by 526 days.

(21) Appl. No.: 12/429,449

(22) Filed: Apr. 24, 2009

(65) Prior Publication Data

US 2010/0126692 A1 May 27, 2010

(30) Foreign Application Priority Data

Nov. 21, 2008 (KR) .................. 10-2008-0115983

(51) Int. Cl.
*F01P 3/00* (2006.01)
(52) U.S. Cl.
USPC ........ 123/41.29; 123/41.31; 165/41; 165/140
(58) Field of Classification Search ............... 123/41.01, 123/41.29, 41.31, 41.51; 165/41, 140, 51, 165/174, 52, 150
See application file for complete search history.

(56) References Cited

U.S. PATENT DOCUMENTS

| | | | | |
|---|---|---|---|---|
| 3,752,132 A | * | 8/1973 | Bentz et al. ................. | 123/563 |
| 3,989,103 A | * | 11/1976 | Cieszko et al. .............. | 165/110 |
| 5,086,835 A | * | 2/1992 | Shinmura .................... | 165/144 |
| 5,526,873 A | * | 6/1996 | Marsais et al. ............... | 165/51 |
| 5,575,329 A | * | 11/1996 | So et al. ...................... | 165/167 |
| 5,810,071 A | * | 9/1998 | Pavlin ......................... | 165/284 |
| 6,173,766 B1 | * | 1/2001 | Nakamura et al. ........... | 165/176 |
| 6,793,012 B2 | * | 9/2004 | Fang et al. ................... | 165/140 |
| 6,883,600 B2 | * | 4/2005 | Mano et al. .................. | 165/174 |
| 6,942,023 B2 | * | 9/2005 | Fang et al. ................... | 165/140 |
| 6,997,143 B2 | * | 2/2006 | Piccirilli et al. ............. | 123/41.1 |
| 7,073,570 B2 | * | 7/2006 | Yu et al. ...................... | 165/140 |
| 7,073,571 B2 | * | 7/2006 | Yu et al. ...................... | 165/140 |
| 7,096,932 B2 | * | 8/2006 | Scoville et al. .............. | 165/140 |
| 7,261,148 B2 | * | 8/2007 | Rohrbaugh et al. ......... | 165/158 |
| 7,337,832 B2 | * | 3/2008 | Hu ............................... | 165/140 |
| 2003/0209344 A1 | * | 11/2003 | Fang et al. ................... | 165/140 |
| 2006/0207755 A1 | * | 9/2006 | Kalbacher ................... | 165/140 |
| 2007/0187077 A1 | * | 8/2007 | Kwon et al. ................. | 165/140 |

FOREIGN PATENT DOCUMENTS

| | | | |
|---|---|---|---|
| EP | 1439366 A2 | * | 7/2004 |
| JP | 2005-69600 A | | 3/2005 |
| KR | 10-2007-0027902 A | | 3/2007 |
| KR | 10-2007-0102025 A | | 10/2007 |

* cited by examiner

*Primary Examiner* — Noah Kamen
*Assistant Examiner* — Long T Tran
(74) *Attorney, Agent, or Firm* — Morgan, Lewis & Bockius LLP

(57) ABSTRACT

An integrated hybrid heat exchanger with a multi-sectional structure, may include a first radiator and a second radiator, and/or at least a coolant bypass member disposed between the first and second radiators, the coolant bypass member connecting one end portion of the first radiator and the other end portion of the second radiator so as to fluid-communicate between the first radiator and the second radiator.

17 Claims, 3 Drawing Sheets

INTEGRATED HYBRID HEAT EXCHANGER WITH MULTI-SECTIONAL STRUCTURE

CROSS-REFERENCE TO RELATED APPLICATION

The present application claims priority to Korean Patent Application No. 10-2008-0115983 filed Nov. 21, 2008, the entire contents of which application is incorporated herein for all purposes by this reference.

BACKGROUND OF THE INVENTION

1. Field of the Invention

The present disclosure relates to an integrated hybrid heat exchanger for a hybrid vehicle. More particularly, it relates to an integrated hybrid heat exchanger with a multi-sectional structure, in which an electrical component cooling system and an internal combustion engine cooling system are integrated into a single cooling system and a radiator for preventing thermal shock and providing thermal resistance is provided to improve cooling efficiency and durability.

2. Description of Related Art

In general, a hybrid vehicle is a vehicle that is equipped with an internal combustion engine and a motor such that the vehicle is driven by one or both of the engine and the motor.

The hybrid vehicle is driven by the motor during initial driving or during cruise driving and is driven by the internal combustion engine during uphill driving or during battery discharge, thus improving fuel efficiency.

Here, since electrical components including the motor generate heat during operation, it is necessary to provide a cooling system that prevents an increase in the temperature of the components in order to maintain the input and output characteristics of the components at an optimum state.

Especially, in the case of a battery, it is necessary to maintain an optimum temperature in order to maintain the overall charge-discharge efficiency at its best.

Accordingly, the heat generated during the charge and discharge of the battery is cooled to the optimum temperature using the cooling system.

For example, when the hybrid vehicle is driven by the motor, heat is generated by a phase shift of current (AC to DC) in an inverter, and heat is also generated during operation of the motor and an electric generator. In order to cool these electrical components, the hybrid vehicle includes an electrical component cooling system in which cooling water is circulated through an electric pump→the inverter→an inverter reservoir tank→a radiator during operation of the motor.

Accordingly, a hybrid cooling system is operated by two cooling systems including the electrical component cooling system and an internal combustion engine cooling system.

In this hybrid cooling system, the internal pressures of an integrated radiator, in which individual radiators are hydraulically isolated from fluid communication with each other, may be different from each other according to the operation of the internal combustion engine and the electric motor, the flow rate of a water pump, and the temperature of coolant. In this case, the dynamic pressures may be different from each other even if the total pressures are the same.

Recently, an integrated cooling system, in which the electrical component cooling system and the internal combustion engine cooling system are integrated into a single cooling system so as to provide an improvement in cooling efficiency, an advantage of layout design, a reduction in the number of components, and a reduction in manufacturing cost, is proposed.

For example, Japanese Patent Publication No. 1998-259721 and U.S. Pat. No. 6,124,644 disclose cooling systems, in which an existing internal combustion engine radiator is divided into a radiator for an internal combustion engine and a radiator for electrical components.

However, in the case of the cooling system disclosed in Japanese Patent Publication No. 1998-259721 and the cooling system disclosed in U.S. Pat. No. 6,124,644, the radiator for the internal combustion engine having a higher operating temperature (about 112° C.) and the radiator for the electrical components having a lower operating temperature (about 80° C.) are in direct contact with each other, and thereby heat is continuously conducted to diaphragm and core portions. As a result, the temperature of the radiator for the electrical components is increased, which deteriorates the efficiency of electrical components reduces the output power during operation of the electrical components.

Moreover, the operation of the internal combustion engine is stopped during cold start at sub-zero temperatures (for example, −20° C.) and only the electrical system is operated. In this case, if coolant at a temperature (for example, 60° C.), heated by the operation of the electrical components is suddenly supplied to the radiator for the electrical components, the contractile force at the lower temperature side and the expansive force at the higher temperature side are simultaneously generated at the diaphragm portion, the core portion, and a bonding portion between the core and header, thus causing thermal shock.

If such a situation continues for a long time, it may cause leakage due to fatigue at the direct contact portions.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide an integrated hybrid heat exchanger with a multi-sectional structure, in which a radiator for electrical components and a radiator for an internal combustion engine are integrated into a single structure, in which each of the two radiators has an independent coolant flow structure in which the flow of liquid fluid is reduced by a pressure difference between the two radiators such that coolant in the radiator for the internal combustion engine and coolant in the radiator for the electrical components are not mixed with each other, and a sub-radiator having a connection structure that serves as a buffer between the radiator for the electrical components and the radiator for the internal combustion engine is provided to prevent thermal shock and provide thermal resistance. Therefore, it is possible to effectively reduce the thermal shock and improve the thermal resistance to thermal conduction, thus improving the overall cooling efficiency and durability.

In one aspect, the present invention provides an integrated hybrid heat exchanger comprising a first radiator and a second radiator, and at least a coolant bypass member disposed between the first and second radiators, the coolant bypass member connecting one end portion of the first radiator and the other end portion of the second radiator so as to fluid-communicate between the first radiator and the second radiator.

Longitudinal axes of the coolant bypass member and the first and second radiators may be disposed substantially in parallel.

The first and second radiators and the coolant bypass member may be integrated into a single structure.

The integrated hybrid heat exchanger may further include a first radiator tank connected to the one end portion of the first radiator and one end portion of the second radiator in common, a second radiator tank connected to both the other end portions of the first and second radiators in common, first and second baffles installed in the first radiator tank, wherein the first baffle divides the first radiator tank into upper and lower spaces so as to form a first middle space between the first and second baffles and the second baffle includes a bypass hole, wherein the upper space of the first radiator tank is fluidly-connected to the first radiator and the lower space of the first radiator tank is fluidly-connected to the second radiator, and third and fourth baffles installed in the second radiator tank, wherein the third baffle divides the second radiator tank into upper and lower spaces so as to form a second middle space between the third and fourth baffles and the fourth baffle includes a bypass hole, wherein the upper space of the second radiator tank is fluidly-connected to the first radiator and the lower space of the second radiator tank is fluidly-connected to the second radiator and wherein the first middle space and the second middle space fluidly communicate through the coolant bypass member.

The first bypass hole may open to the upper space of the first radiator tank and the second bypass hole may open to the lower space of the second radiator tank.

The first bypass hole may open to the lower space of the first radiator tank and the second bypass hole may open to the upper space of the second radiator tank.

The upper and lower spaces of the first radiator tank may include a coolant inlet respectively and the upper and lower spaces of the second radiator tank include a coolant outlet respectively.

The coolant outlet of the first radiator may be disposed lower than the coolant inlet thereof and the coolant outlet of the second radiator may be disposed lower than the coolant inlet thereof.

The thicknesses of cores in the first radiator, the second radiator, and the coolant bypass member may be different from each other, wherein the thickness of core in the coolant bypass member may be smaller than the thicknesses of cores in the first and second radiators.

The first radiator may be configured to cool an internal combustion engine and the second radiator may be configured to cool electrical components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
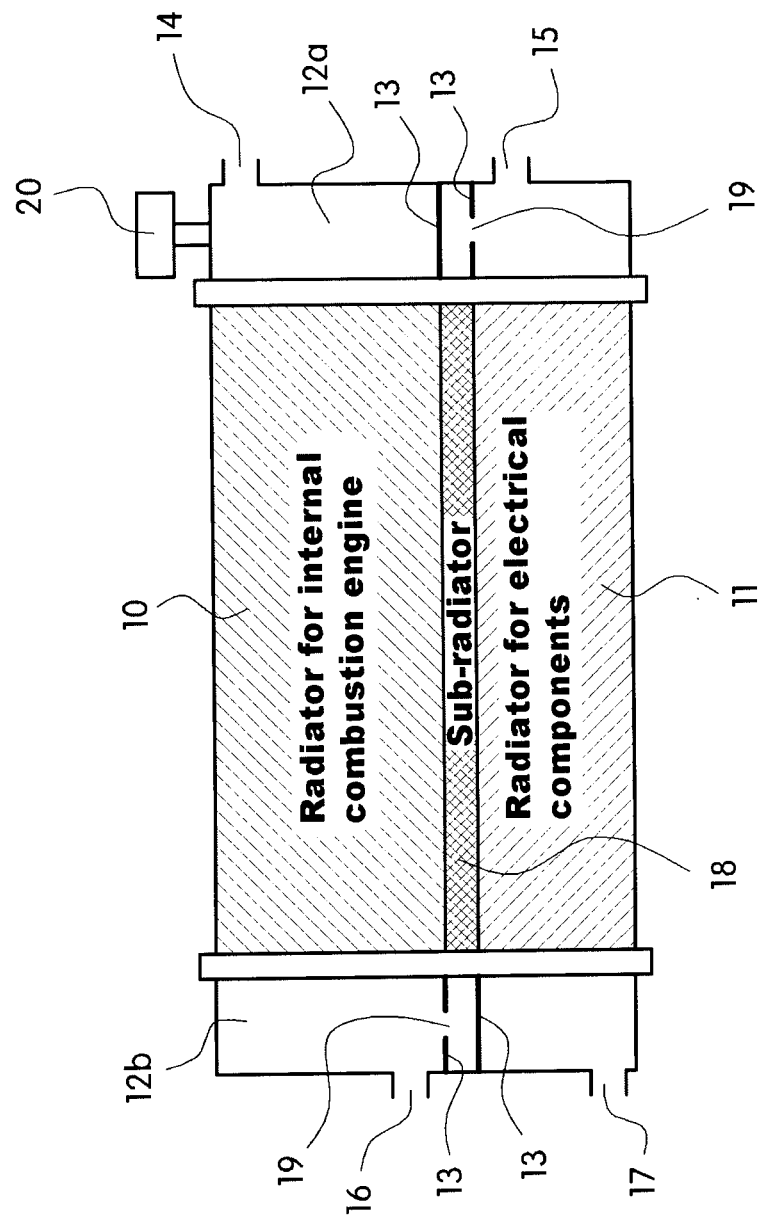
FIG. 1 is a schematic diagram showing an integrated hybrid heat exchanger with a multi-sectional structure in accordance with an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a schematic diagram showing an integrated hybrid heat exchanger with a multi-sectional structure in accordance with various embodiments of the present invention.

As shown in FIG. 1, in a hybrid cooling system including two cooling systems such as an electrical component cooling system and an internal combustion engine cooling system, the integrated hybrid heat exchanger with the multi-sectional structure is formed by combining a radiator 11 for electrical components and a radiator 10 for an internal combustion engine, each having an independent coolant flow structure, into a single structure and by including a sub-radiator 18 for preventing thermal shock and providing thermal resistance, which is connected to the radiators 10 and 11 while partitioning the radiators 10 and 11 and serves as a buffer between the radiators 10 and 11. Therefore, the integrated hybrid heat exchanger with the multi-sectional structure of the present invention can effectively reduce the thermal shock during operation of the electrical component cooling system and reduce the thermal conduction between the radiators, thus improving the overall cooling efficiency and durability.

For this purpose, the radiator 10 for the internal combustion engine and the radiator 11 for the electrical components are arranged up and down in parallel and combined into a single structure, each of the two radiators having an independent coolant flow passage. Radiator tanks 12a and 12b are connected to both sides of the radiator 10 for the internal combustion engine and the radiator 11 for the electrical components, respectively. Especially, a pair of baffles 13, spaced at a distance from each other, is installed in each of the two radiator tanks 12a and 12b such that the internal space of each radiator tank is divided into upper and lower spaces.

As a result, the upper space in each of the radiator tanks 12a and 12b is connected to the radiator 10 for the internal combustion engine, and the lower space is connected to the radiator 11 for the electrical components.

A coolant inlet 14 for an internal combustion engine and a coolant outlet 16 for an internal combustion engine are installed in the upper space of each of the radiator tanks 12a and 12b to supply and discharge coolant therethrough, and a coolant inlet 15 for electrical components and a coolant outlet 17 for electrical components are installed in the lower space of each of the radiator tanks 12a and 12b.

Here, it is preferable that the coolant inlets 14 and 15 be positioned at a height greater than that of the coolant outlets 16 and 17.

With the use of the coolant inlets 14 and 15 and the coolant outlets 16 and 17, it is possible to construct two kinds of cooling circuits for the internal combustion engine and for the electrical components.

For example, the cooling circuit for the internal combustion engine may be composed of the coolant outlet 16 for the internal combustion engine→an engine water pump 22→an internal combustion engine 23→the coolant inlet 14 for the internal combustion engine. The cooling circuit for the electrical components may be composed of the coolant outlet 17 for the electrical components→an electric water pump 25→an inverter 26→a reservoir tank 24b→an ISG 27→the coolant inlet 15 for the electrical components.

A line extending from one side of a cap 20 mounted at the top of the radiator tank 12a is connected to a reservoir tank 24a.

Moreover, the thicknesses of cores in the radiator 10 for the internal combustion engine, the radiator 11 for the electrical components, and the sub-radiator 18, which will be described later, may be different from each other in accordance with required heat capacities.

For example, in the case where the electrical components have a high capacity, the thicknesses of the cores used in the radiator 11 for the electrical components may be set to a thickness suitable for high capacity heat exchange.

Particularly, the present invention provides a structure in which the sub-radiator 18 defining a separate space is disposed between the radiator 10 for the internal combustion engine and the radiator 11 for the electrical components such that the sub-radiator 18 prevents thermal shock and provides thermal resistance.

For this purpose, the sub-radiator 18 is disposed in parallel between the radiator 10 for the internal combustion engine and the radiator 11 for the electrical components, which are arranged up and down in parallel and, in this case, the sub-radiator 18 is connected to the space defined by the pair of baffles 13 in each of the radiator tanks 12a and 12b.

Moreover, a bypass hole 19 is formed on one of the pair of baffles 13 in each of the radiator tanks 12a and 12b. One end portion of the sub-radiator 18 is connected to the tank of the radiator 11 for the electrical components and the other end portion thereof is connected to the tank of the radiator 10 for the internal combustion engine.

That is, the front side corresponding to the right side of the figure of the sub-radiator 18 is connected to the coolant inlet 15 of the radiator 11 for the electrical components, and the rear side corresponding to the left side of the figure is connected to the coolant outlet 16 of the radiator 10 for the internal combustion engine.

Therefore, a portion of coolant flowing in the radiator 11 for the electrical components may be supplied to the sub-radiator 18, or an extremely small amount of coolant discharged from the radiator 10 for the internal combustion engine may sometimes be supplied to the sub-radiator 18.

In this manner, since the sub-radiator is disposed between the two radiators so as to be connected thereto such that it accommodates a portion of coolant flow and, at the same time, prevents the direct contact between the two radiators, it is possible to reduce the thermal shock applied to the heat exchangers and also reduce the thermal conduction between the heat exchangers.

The coolant flow according to operation conditions in the integrated hybrid heat exchanger with the multi-sectional structure will be described below.

Figure 2:
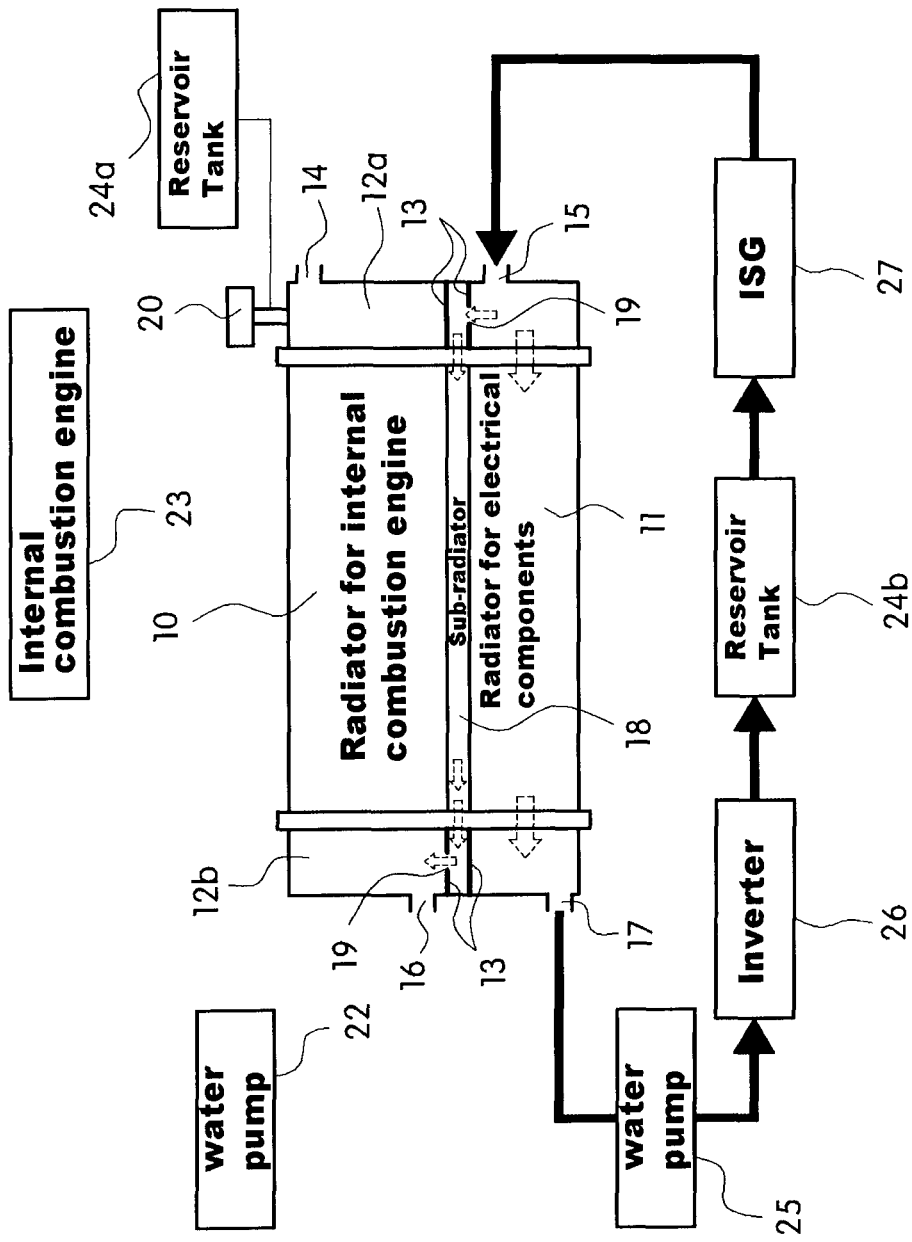
FIG. 2 is a schematic diagram showing coolant flow during cold start in the integrated hybrid heat exchanger with the multi-sectional structure in accordance with the exemplary embodiment of the present invention.

FIG. 2 is a schematic diagram showing the coolant flow during operation of the electrical components in the integrated hybrid heat exchanger with the multi-sectional structure in accordance with various embodiments of the present invention.

As shown in FIG. 2, in the case of the hybrid vehicle, the electrical system is driven during start-up, but the internal combustion engine is not driven to improve fuel efficiency.

During cold start, the coolant heated by passing through the inverter 26 is introduced into the radiator 11 for the electrical components with the operation of the electric water pump 25.

At this time, a pressure difference is created between the coolant in the electrical component cooling system, in which the pressure is increased by the operation of the electric water pump 25, and the coolant in the combustion engine cooing system, in which the engine water pump 22 is not operated.

Therefore, a substantial amount of coolant at high temperature introduced through the coolant inlet 15 for the electrical components passes through the radiator 11 for the electrical components and then is discharged through the coolant outlet 17 for the electrical components, and a portion of the coolant is bypassed through the bypass hole 19 to the sub-radiator 18 by the pressure difference and then supplied to the radiator tank 12b at the radiator 10 for the internal combustion engine.

The bypassed coolant increases the temperature of the flow path, i.e., the temperature in the sub-radiator 18, such that the temperature gradient decreases gradually such as the electrical components>the sub-radiators>the internal combustion engine.

Since the temperature gradient of the bypassed path decreases gradually, the expansive force by heat is gradually generated on the same path.

As a result, since the expansive force is gradually generated, the thermal shock is significantly reduced compared to the conventional structure in which the contractile force at the lower temperature side and the expansive force at the higher temperature side are simultaneously generated at the direct contact portions (the diaphragm portion, the core portion, and the bonding portion between the core and header).

Therefore, with the reduction of thermal shock, it is possible to reduce the possibility of leakage due to accumulation of fatigue.

Figure 3:
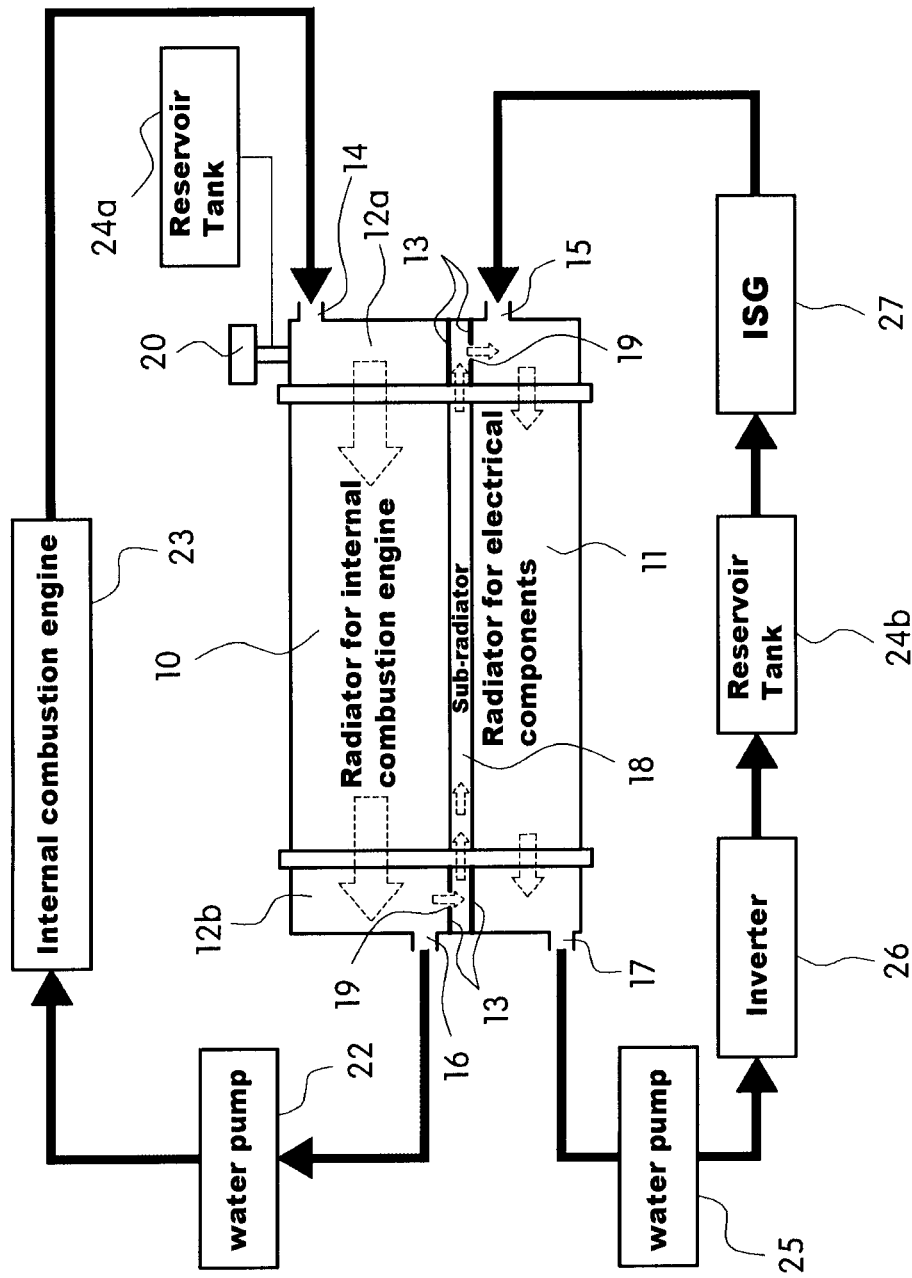
FIG. 3 is a schematic diagram showing coolant flow during high speed driving or during uphill driving in the integrated hybrid heat exchanger with the multi-sectional structure in accordance with the exemplary embodiment of the present invention.

FIG. 3 is a schematic diagram showing coolant flow during high speed driving or during uphill driving in the integrated hybrid heat exchanger with the multi-sectional structure in accordance with various embodiments of the present invention.

As shown in FIG. 3, during high speed driving or during uphill driving, the flow rate of the engine water pump is more than 10 times greater than that of the electric water pump.

With the pressure difference due to the difference in flow rate, the coolant from the radiator 10 for the internal combustion engine at high temperature is bypassed through the bypass hole 19 to the sub-radiator 18 and then supplied to the radiator 11 for the electrical components.

The amount of the bypassed coolant at high temperature is very small since the passage area of the sub-radiator 18 is small, which increases the path resistance.

The small amount of the bypassed coolant at high temperature is cooled by passing through the sub-radiator 18 and then supplied to the radiator 11 for the electrical components.

In this manner, since the temperature of the coolant is cooled to a middle-low temperature by passing through the sub-radiator 18 and then supplied to the radiator 11 for the electrical components, the temperature of the coolant in the electrical system is not increased, thus preventing deterioration in the efficiency of the electrical components and preventing a reduction in output power due to the increase in the temperature of the coolant.

Meanwhile, the integrated heat exchanger including the sub-radiator 18 can provide thermal resistance to thermal conduction.

Coolant at a high temperature of about 110° C. flows in the radiator for the internal combustion engine, and coolant at a middle-low temperature of about 70° C. flows in the radiator for the electrical components. Since each radiator is composed of core pins of and tubes, a large amount of heat may be conducted from the higher temperature side to the lower temperature side.

However, with the sub-radiator for preventing thermal heat and providing thermal resistance disposed between the radiator for the internal combustion engine and the radiator for the electrical components, the temperature difference is reduced to less than 40° C., for example, compared to the conventional structure, thus reducing the amount of thermal conduction.

As such, since the sub-radiator for preventing thermal heat and providing thermal resistance is disposed between the radiator for the internal combustion engine and the radiator for the electrical components, it is possible to reduce the thermal shock and the thermal conduction, thus significantly improving the cooling efficiency and durability of the electrical component cooling system as well as the internal combustion engine cooling system.

As described above, the integrated hybrid heat exchanger with the multi-sectional structure provided by the present invention has the following and other advantages.

1. Reduction in thermal shock: with the gradual temperature distribution in the radiators, it is possible to reduce the thermal shock due to sudden intake of hot coolant.

2. Improvement in the cooling efficiency of the electrical system due to the minimization of thermal conduction: it is possible to minimize the thermal conduction from the radiator for the internal combustion engine at higher temperature to the radiator for the electrical components at lower temperature.

3. Improvement in the efficiency of electrical components and prevention of reduction in power output: it is possible to improve the cooling efficiency of the radiator for the electrical components by the minimization of thermal conduction to the radiator for the electrical components.

4. Improvement in durability: it is possible to reduce the accumulation of fatigue by the reduction in thermal shock, thus improving the durability.

5. Reduction in manufacturing cost: since the core portion of the electrical component cooling system and the core portion of the internal combustion engine cooling system are applied to one header and one tank, it is possible to reduce the manufacturing cost, compared to the conventional structure in which two heat exchangers are used, respectively.

6. Reduction in process: it is possible to eliminate one clinching process and weld at least two core portions at one time.

7. Reduction in weight and simplification in structure: since each of the tank and the header is eliminated, it is possible to reduce the weight and simplify the structure, compared to the conventional structure in which two heat exchangers are used.

For convenience in explanation and accurate definition in the appended claims, the terms, "upper", "lower", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An integrated hybrid heat exchanger with a multi-sectional structure, comprising:
   a first radiator and a second radiator; and
   at least a coolant bypass member being in direct fluid contact with the first and second radiators, wherein the at least a coolant bypass member is interposed between and extends adjacent and parallel to the first and second radiators, the coolant bypass member connecting one end portion of the first radiator and the other end portion of the second radiator so as to fluid-communicate between the first radiator and the second radiator through the at least a coolant bypass member,
   wherein the first radiator is configured to cool an internal combustion engine.

2. The integrated hybrid heat exchanger of claim 1, wherein longitudinal axes of the coolant bypass member and the first and second radiators are disposed substantially in parallel.

3. The integrated hybrid heat exchanger of claim 2, wherein the first and second radiators and the coolant bypass member are integrated into a single structure.

4. The integrated hybrid heat exchanger of claim 1, further comprising:
   a first radiator tank connected to the one end portion of the first radiator and one end portion of the second radiator in common;
   a second radiator tank connected to both the other end portions of the first and second radiators in common;
   first and second baffles installed in the first radiator tank, wherein the first baffle divides the first radiator tank into upper and lower spaces so as to form a first middle space between the first and second baffles and the second baffle includes a first bypass hole, wherein the upper space of the first radiator tank is fluidly-connected to the first radiator and the lower space of the first radiator tank is fluidly-connected to the second radiator through the first bypass hole; and
   third and fourth baffles installed in the second radiator tank, wherein the third baffle divides the second radiator tank into upper and lower spaces so as to foam a second middle space between the third and fourth baffles and the fourth baffle includes a second bypass hole, wherein the upper space of the second radiator tank is fluidly-connected to the first radiator and the lower space of the second radiator tank is fluidly-connected to the second radiator through the second bypass hole and wherein the first middle space and the second middle space fluidly communicate through the coolant bypass member.

5. The integrated hybrid heat exchanger of claim 4, wherein the first bypass hole opens to the upper space of the first radiator tank.

6. The integrated hybrid heat exchanger of claim 5, wherein the second bypass hole opens to the lower space of the second radiator tank.

7. The integrated hybrid heat exchanger of claim 5, wherein the first bypass hole opens to the lower space of the first radiator tank.

8. The integrated hybrid heat exchanger of claim 5, wherein the second bypass hole opens to the upper space of the second radiator tank.

9. The integrated hybrid heat exchanger of claim 5, wherein the upper and lower spaces of the first radiator tank include a coolant inlet respectively and the upper and lower spaces of the second radiator tank include a coolant outlet respectively.

10. The integrated hybrid heat exchanger of claim 9, wherein the coolant outlet of the first radiator is disposed lower than the coolant inlet thereof.

11. The integrated hybrid heat exchanger of claim 10, wherein the coolant outlet of the second radiator is disposed lower than the coolant inlet thereof.

12. The integrated hybrid heat exchanger of claim 1, wherein the thicknesses of cores in the first radiator, the second radiator, and the coolant bypass member are different from each other.

13. The integrated hybrid heat exchanger of claim 1, wherein the thickness of core in the coolant bypass member is smaller than the thicknesses of cores in the first and second radiators.

14. The integrated hybrid heat exchanger of claim 1, wherein the second radiator is configured to cool electrical components.

15. The integrated hybrid heat exchanger of claim 1, wherein the first and second radiators and the coolant bypass member are monolithically formed.

16. A vehicle cooling system comprising an internal combustion engine and an inverter cooled by the integrated hybrid heat exchanger of claim 1.

17. A vehicle comprising the vehicle cooling system of claim 16.

* * * * *